United States Patent [19]
Apostolos et al.

[11] 4,166,980
[45] Sep. 4, 1979

[54] METHOD AND APPARATUS FOR SIGNAL RECOGNITION

[75] Inventors: John T. Apostolos, Merrimack, N.H.; Robert P. Boland, Malden, Mass.

[73] Assignee: Sanders Associates, Inc., Nashua, N.H.

[21] Appl. No.: 827,521

[22] Filed: Aug. 25, 1977

[51] Int. Cl.² .................................................. H04B 17/00
[52] U.S. Cl. ................................. 325/363; 324/77 R; 325/332
[58] Field of Search ............. 324/77 R, 77 A; 325/67, 325/363, 133, 332, 333, 337

[56] References Cited

U.S. PATENT DOCUMENTS

| 2,779,869 | 1/1957 | Gerks | 325/67 |
|---|---|---|---|
| 3,465,247 | 9/1969 | Kubo | 324/77 A |
| 3,560,852 | 2/1971 | Haskin et al. | 324/77 R |
| 3,568,054 | 3/1971 | Ross | 324/77 R |
| 3,743,942 | 7/1973 | Carpenter | 325/337 |
| 3,820,025 | 6/1974 | Lahr et al. | 324/77 R |
| 3,880,147 | 4/1975 | Gruenke et al. | 324/77 R |
| 3,982,101 | 9/1976 | Kalb et al. | 324/77 R |

Primary Examiner—Marc E. Bookbinder
Attorney, Agent, or Firm—Louis Etlinger; Joseph E. Funk

[57] ABSTRACT

A method and apparatus are provided for sorting signals from compressive receivers in accordance with the type of modulation on the signal, so as to be able to establish the identity of the signal short of fully demodulating it. It has been found that signals from a compressive receiver which are insufficiently sampled for complete demodulation can be identified by "histograms" in which each designated condition, such as the number of consecutive 1's of 0's is graphed against the number of occurrences of this designated condition over a period of time, designated a "data collection interval." The result is a pattern or diagram which is characteristic of the modulation type, such that FSK, DFSK, PSK, hand morse, machine morse, anomolous morse, AM, SSB, and multitones can be distinguished one from another. Moreover, it is possible to recognize two-way voice communication.

33 Claims, 12 Drawing Figures

METHOD AND APPARATUS FOR SIGNAL RECOGNITION

FIELD OF THE INVENTION

This invention relates to signal sorting methods and apparatus and more particularly to a method and apparatus for the recognition of the type of modulation on a signal which has been insufficiently sampled for complete demodulation.

BACKGROUND OF THE INVENTION

One of the most important problems in electronic surveillance involves the recognition and identification of a signal in a multi-signal environment. In the past it has been common to use so-called compressive receivers for rapidly sweeping out a given band of frequencies to determine the presence or existance of a signal and its frequency. However, the mere identification of the presence of a signal and its frequency is oftentimes insufficient to obtain the identity of the signal. It is therefore important to identify some other signal parameter as a key to the source of the signal. In this invention the parameter selected is modulation.

With the present day compressive receivers in which the incoming signal is heterodyned with a fast sweeping local oscillator signal, the sampling rate is too slow, e.g. below the Nyquist rate, to be able to completely demodulate the output of the compressive receiver. This means that the sampling time for any given signal is insufficient to permit complete demodulation.

It will, of course, be appreciated that since compressive receivers sweep a band of frequencies rapidly, parallel processing of many channels is possible with the result that copious statistics from all signals in the particular band of interest are available. This means that the high frequency band can be divided into 10,000 different frequency recognition channels. Even with the rapid scan now available practically all signals of interest are insufficiently sampled for purposes of demodulation. Although this lack of valid sampling prevents demodulation, it is a finding of this invention that information about the type of modulation is nonetheless present.

It will be appreciated that in present day compressive receiver, once a signal of interest or possible interest has been found, the incoming signal is switched to a separate receiver for demodulation. However, typically there may be as many as 3,000 to 5,000 signals present or active at any one time, most of which are not of interest. The problem then becomes how to determine the modulation format of the signals while still utilizing a single compressive receiver. It should be noted that the usual technique for sorting signals involves completely parallel receiver channels. As will be seen, the subject technique utilizes only one receiver with parallel circuits for recognizing the type of modulation on the signal. Thus, the subject system may be easily retrofitted to any one of a number of conventional compressive receivers.

In general, the compressive receiver is one which employs a variable frequency oscillator. This oscillator is swept such that its signal, when mixed with an incoming signal (should one be present) produces a linear FM signal. The linear FM signal is coupled to a dispersive delay line which time compresses the linear FM signal. When the output of the dispersive delay line is displayed as a function of time, the position of the compressed pulse on the time axis correlates to the frequency of the incoming signal. This type receiver provides for extremely fast sampling of all the frequencies within, for instance, a 30 MHz band. In the usual case the "revisit" time, that is the time between samples at a given frequency, is on the order of 40 milliseconds.

However, with an incoming signal being sampled only once every 40 milliseconds, the sampling is at less than the Nyquist rate for most signals of interest and it is therefore impossible to completely demodulate the incoming signal.

In view of the foregoing, it is a finding of this invention that there is in fact enough information in the compressive receiver output to recognize the type of modulation.

It is a further finding of this invention that the type of modulation of an incoming signal can be ascertained by the utilization of so-called "histograms." A histogram as defined herein is a graph or correlation of a "designated condition" (bin condition) versus the number of occurrences of the "designated condition" (bin condition) in a given time period called the "data collection interval." This data collection interval in general is made sufficiently long to allow a relatively large number of modulation state changes to have occurred.

As will be seen, the "designated condition" could be the number of "consecutive" 1's or 0's in a transmission, where a 1 or a 0 would be the occurrence of a pulse above or below a given threshold. On-off keying (OOK) can thus be recognized since characteristically these transmissions have recognizable numbers of "consecutive" marks or spaces. The "designated condition" could also be the frequency of the incoming signal or its amplitude.

An example is the recognition that a morse code signal is being sent. In this case, one "designated condition" might be the occurrence of three consecutive 1's versus the number of times that three consecutive 1's condition occurs in a 15 second "data collection interval." Thus, in a 15 second period there might be 14 occurrences of three consecutive 1's and this might be characteristic of a typical morse code signal. In fact, the subject system can distinguish between many types of on-off keying (OOK) signals such as hand morse, machine morse and anomolous morse, which is a morse in which bursts of characters are sent followed by long intervals of dead time.

In addition to distinguishing between different types of OOK signals, the subject system can also distinguish between other types of signals such as frequency shift keying (FSK), phase shift keying (PSK), AM, SSB, and multitone modulation. Moreover, it is possible to detect the presence of voice communication.

Thus, histograms need not be confined to whether there are consecutive 1's or 0's in the transmission, but may also include the frequency distribution of the incoming signal versus the number of times that a given frequency exists, as well as an amplitude distribution charting in which the number of occurrences of each particular amplitude are recorded over a given data collection interval. In short, it is also possible to measure for how many samples a signal is at a given amplitude or for how many samples a signal is at a given frequency.

As another example, if the "designated condition" is frequency, the incoming signal may, for instance, be an FSK signal at 27000.250 KHz or 27000.650 KHz depending on the modulation state. Generating a frequency histogram would result in a graph of the 27000.250 KHz and the 27000.650 KHz conditions versus the number of times the incoming signal was at either 27000.250 KHz or 27000.650 KHz during 15 second "data collection interval." This is unlike spectrum analysis because the ordinate is not amplitude but rather the number of times that a given frequency occurs during a given "data collection interval."

The result of generating these types of histograms is a diagram, correlation, or pattern which is characteristic of the modulation type, such that FSK, PSK, hand morse, machine morse, anomolous morse, SSB, multitones, and AM can be distinguished one from the other. In general, the histogram is generated at a histogram generator and the output of the histogram generator is coupled to a processing unit for the recognition of the particular type of modulation of interest. Once such a signal exists an alarm may be initiated and a conventional receiver can be activated to fully demodulate the incoming signal.

For instance, if it is desirable to choose only FSK signals, all other signals from the compressive receiver can be ignored and the signals of interest can then be shunted to a conventional FSK receiver for demodulation, thereby precluding the necessity of shunting the many signals that are present to a variety of different conventional receivers for demodulation. By utilization of this modulation sorting technique the number of conventional receivers may be reduced with a concomitant reduction in time to signal acquisition.

The subject histograms therefore provide a new type of graphing correlation and display technique for portraying the type of signal which is being received. It also provides a unique method of identifying signals from a compressive receiver by specifying the modulation-related characteristics which are sought.

In order to supply the requisite signals for frequency histogram production, a specialized device called a "center finder pulse" generator is utilized which in essence tracks the envelope of the signals from the compressive receiver, finds the peak of the envelope and produces a pulse at this time. By generating the center finder pulse at a particular time corresponding to the particular frequency sweep of the compressive receiver, its location on the abscissa specifies the frequency of the incoming signal (including modulation). One type center finder pulse generator described hereinafter results in frequency histograms having frequency bins as narrow as 55 Hz. This permits recognition of FSK modulation.

Moreover, for the 1's, 0's histograms a specialized 0's and 1's histogram data generator is provided, which includes a unique combination of a conventional thresholding circuit and a latched counter.

It is therefore an object of this invention to provide a method and apparatus for signal recognition in which histograms are utilized in characterizing the type of modulation on the signal.

It is a further object of this invention to provide a method and apparatus for identifying the modulation type of signals which are insufficiently sampled for complete demodulation.

It is another object of this invention to provide a method and apparatus for identifying the signals from a compressive receiver.

It is yet another object of this invention to provide a system for identifying incoming signals utilizing a single receiver and parallel histogram type modulation sorting apparatus.

It is a yet still further object of this invention to provide a signal recognition system involving the use of compressive receivers and a center finder pulse generator.

It is another object of this invention to provide a unique consecutive 1's and 0's histogram generator.

These and other objects will be better understood in connection with the following specification taken in conjunction with the following drawings in which.

DETAILED DESCRIPTION

Figure 1:
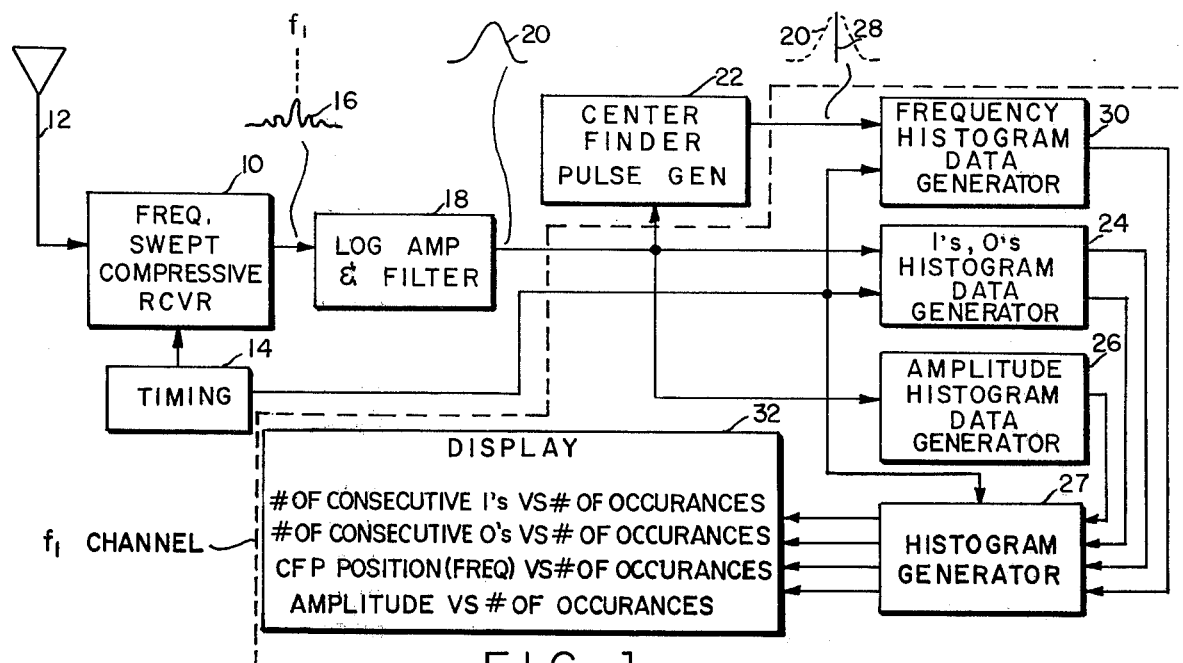
FIG. 1 is a block diagram of the subject system illustrating a frequency swept compressive receiver, center finder pulse generator and histogram display apparatus.

Referring now to FIG. 1 a conventional frequency swept compressive receiver 10 is provided with an antenna 12 and a timing circuit 14 which times the frequency sweeps of the compressive receiver. Note, the timing circuit is usually part of the receiver. The compressive receiver is conventional and is available as Model No. SLR-16 from Sanders Associates, Inc., Nashua, New Hampshire. As mentioned hereinbefore it is a function of the compressive receiver to detect incoming signals over a predetermined frequency band by hetrodyning a local oscillator signal with the incoming signals. The sweep of the local oscillator is very carefully controlled so that at any given point in time the frequency output of the compressive receiver is accurately determined. One such control system is illustrated in U.S. Pat. No. 3,382,460 issued to D. Blitz et al on May 7, 1968. The output from the compressive receiver at one instant of time is illustrated at 16 for an incoming signal at 12. The output of the compressive receiver is applied to a conventional log amplifier and filter 18 the output of which is illustrated at 20.

Waveform 20 is basically a parabolic curve and is applied to data generators 24 and 26 which provide data in digital form to a generalized histogram generator 27. These generators respectively supply the data for the 1's, 0's histogram, and the amplitude histogram.

Additionally, the output of unit 18 is applied to a center finder pulse generator 22. The output of the center finder pulse generator is illustrated at 28 to be a pulse which is accurately centered on waveform 20 thereby defining the frequency of the incoming signal. As will be described hereinafter, by utilization of a specialized center finder pulse generator circuit, positional accuracy of the center finder pulse 28 in one embodiment is ±27.5 Hz. The output of the center finder pulse generator is applied to a frequency histogram data generator 30 which is coupled to histogram generator 27. The output of timing unit 14 is applied to histogram generator 27 such that the output of the histogram generator may be correlated with a given input signal frequency.

The outputs of histogram generator 27 are applied to a conventional display 32 which may either be a CRT type display or a hard copy printout in which the data is represented by a string of similar characters such as "x's." As will be seen, the display can portray the number of consecutive 1's versus the number of such occurrences, the number of consecutive 0's versus the number of such occurrences, the center finder pulse position (frequency) versus the number of occurrences and the amplitude of the output from the log amplifier versus the number of such occurrences.

What has been illustrated thus far is a single channel system in which the histogram generator is actuated when the output of the compressive receiver is at a single predetermined frequency. It will be appreciated that by providing parallel channels composed of units 24, 26, 27 and 30 the whole range of frequencies scanned by the compressive receiver may be processed for modulation type.

Figure 2:
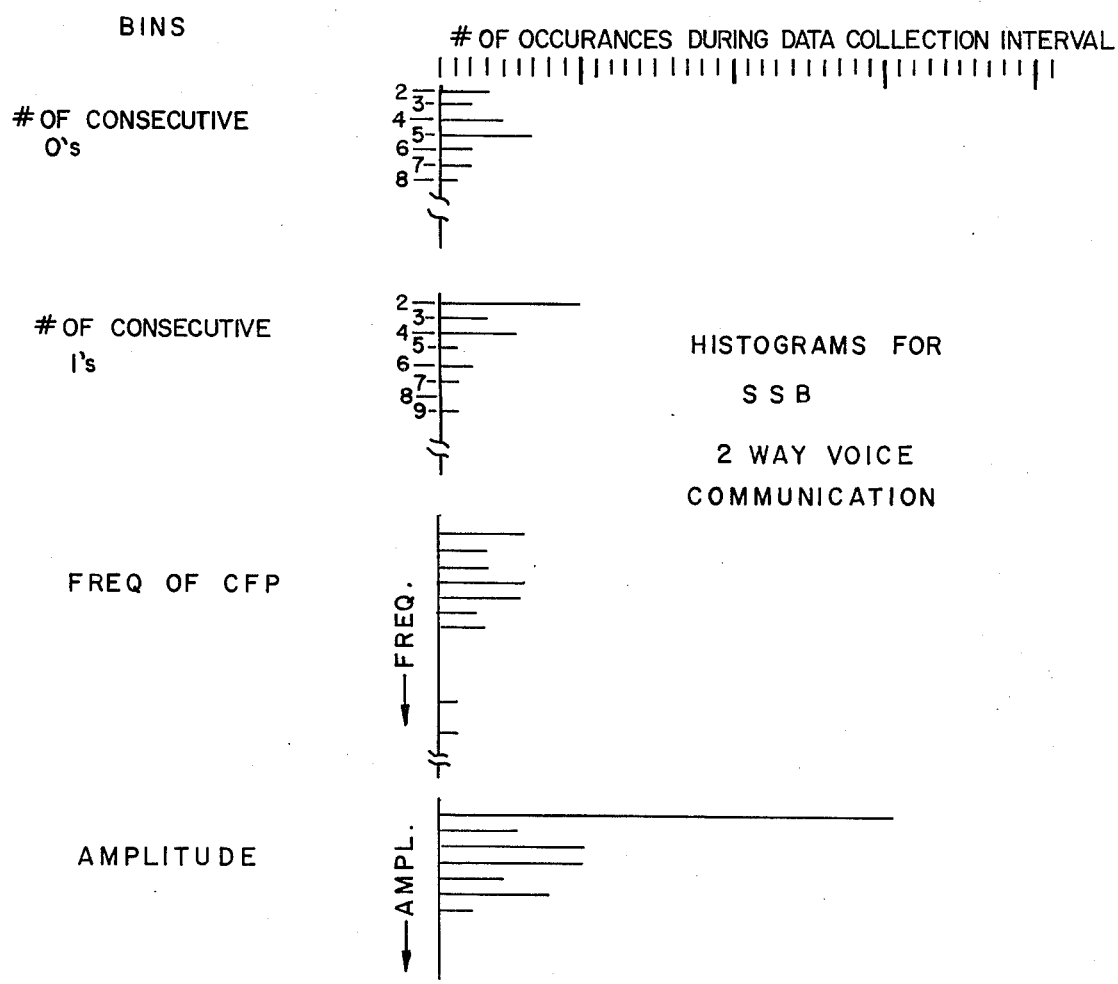
FIG. 2 is a diagram showing histograms for an SSB two-way voice communication.

One type of representation which is available from display 32 is illustrated in FIG. 2. In this figure the histograms for an SSB 2-way communication are depicted. As can be seen, for a 15 second "data collection interval" there were approximately four occurrences of two consecutive 0's; three occurrences of three consecutive 0's; five occurrences of four consecutive 0's and seven occurrences of five consecutive 0's, etc.

As to the number of consecutive 1's there were approximately 20 occurrences of two consecutive 1's; four occurrences of three consecutive 1's and 12 occurrences of four consecutive 1's, etc. Referring to the frequency of the CFP (and thus the incoming signal) it can be seen that there are 5 occurrences of the input signal at 3.859 MHz±27.5 Hz, 3 occurrences of the signal at 3.859 MGz+55 Hz±27.5 Hz; 3 occurrences of the signal at 3.859 MHz+110 Hz±27.5 Hz; 5 occurrences of the signal at 3.859 MHz+165 Hz±27.5 Hz etc. Here the frequency bins are 55 Hz apart.

The amplitude histogram of the two way communication is interesting in that for the majority of the time, the amplitude was at first amplitude level of 0 (e.g. no talking). This is characteristic of most two-way voice communications. As can be seen, the number of consecutive 1's and 0's are not particularly distinguished, nor is the frequency except that is fairly evenly distributed over the time period.

Figure 3:
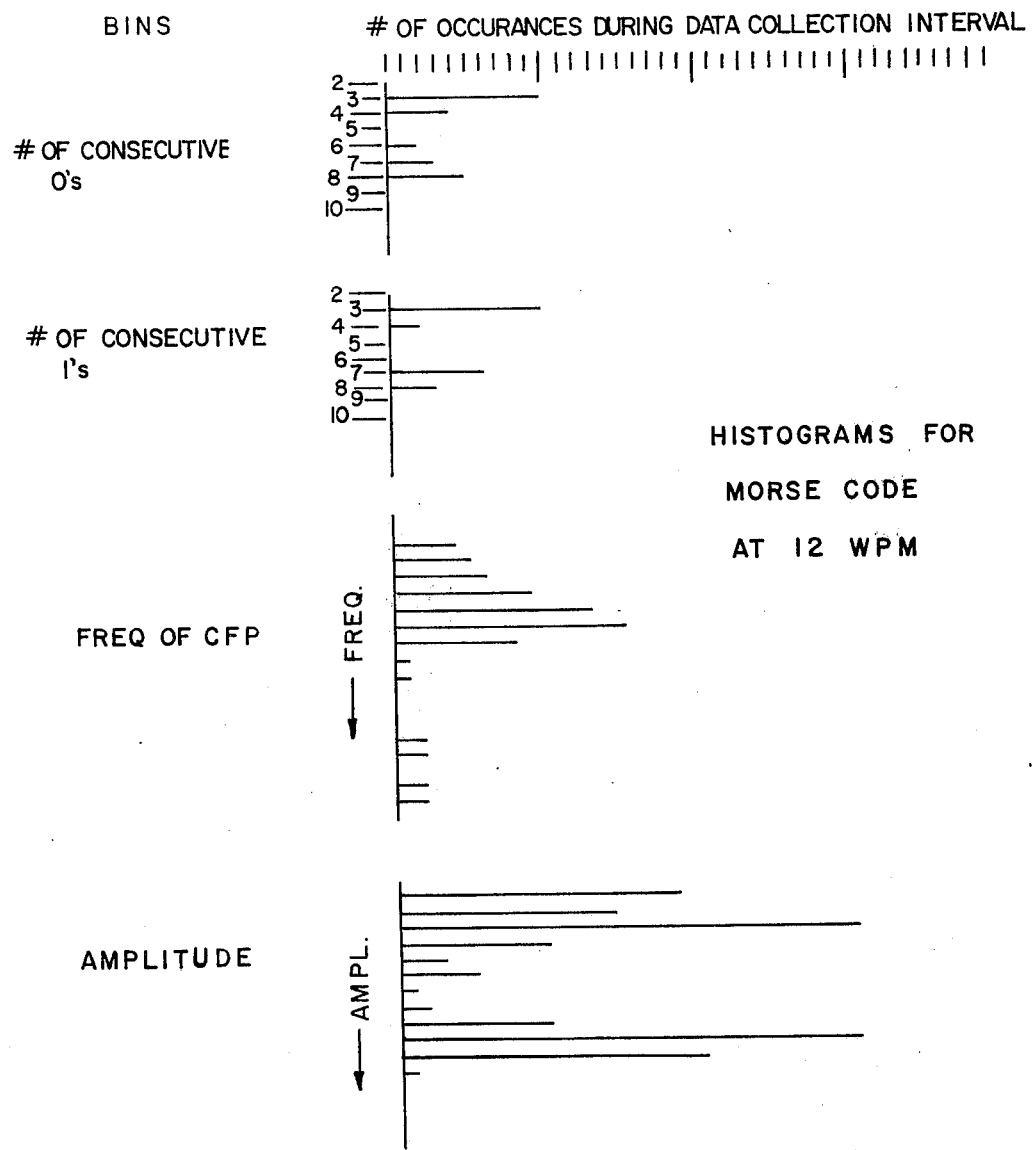
FIG. 3 is a diagram of histograms for morse code at 12 words per minute.

Referring to the morse code case of FIG. 3 it can be seen that the number of 0's and the number of 1's have definite spikes in their histograms, whereas the frequency envelope of the CFP is almost a bell-shaped type curve. Moreover, there are characteristically two amplitude peaks as illustrated. Thus, the histograms of FIG. 3 may be distinguished from the histograms of FIG. 2 in that, at least for morse code, the peaks of the 1's and 0's histograms have a representative pattern, and in that not only is there a bell-shaped frequency distribution representing one frequency during the ON period and more noise during the OFF periods, but also there are two distinct amplitude distributions representing the ON and OFF states versus the single amplitude peak of a two-way voice communication amplitude histogram.

Figure 4:
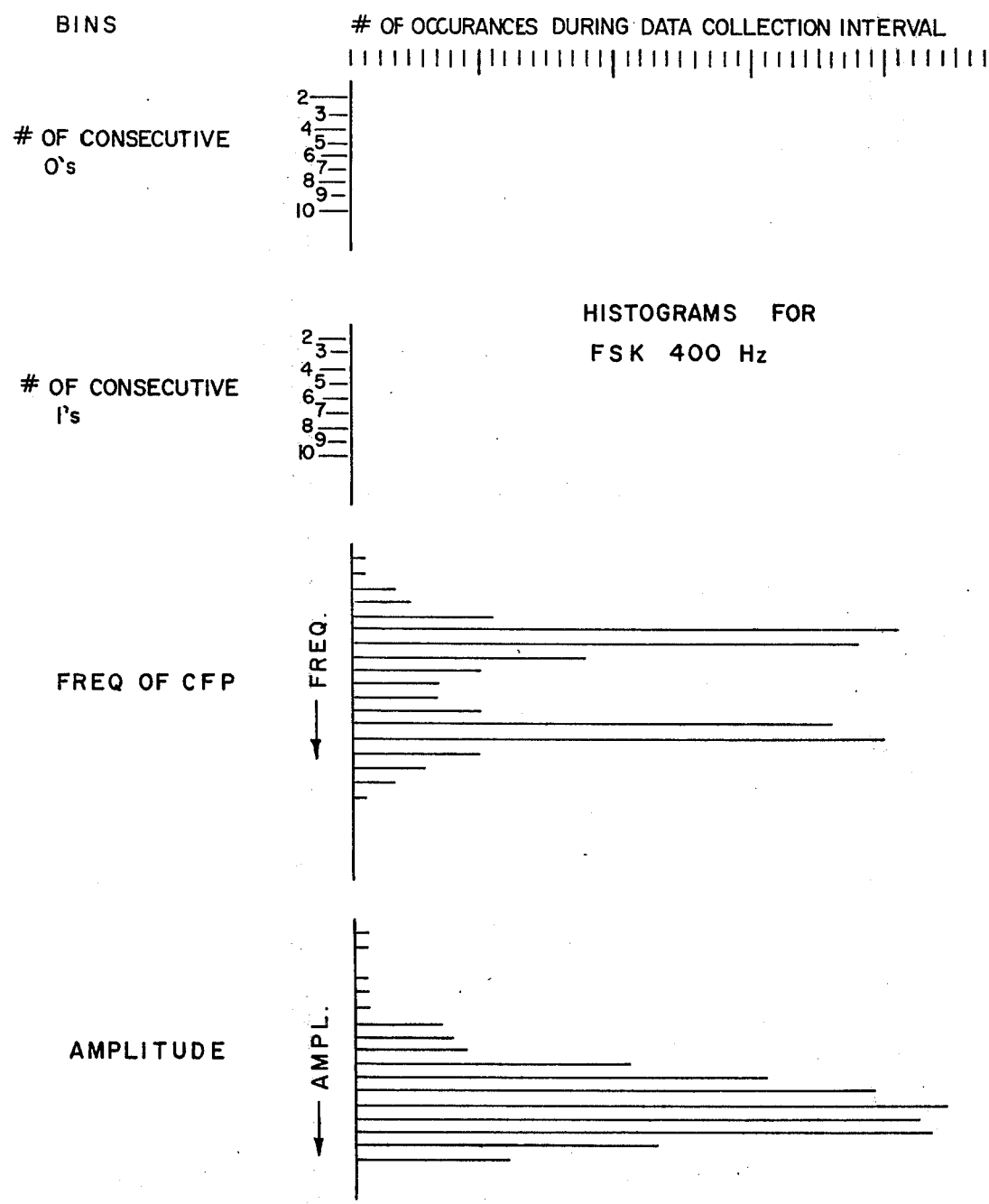
FIG. 4 is a diagram showing histograms for an FSK transmission with 400 hertz separation.
Figure 5:
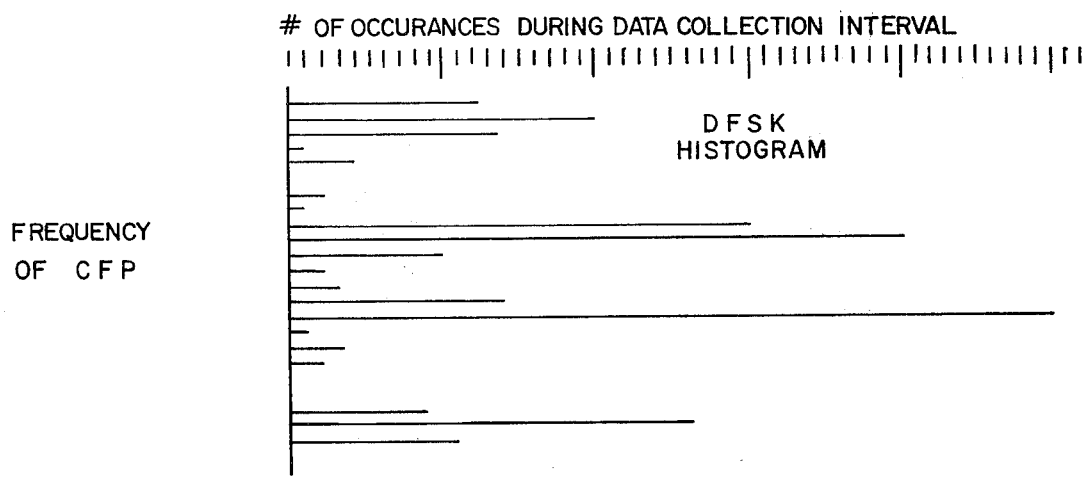
FIG. 5 is a frequency histogram of a double FSK signal (DFSK).

Referring to FIG. 4 it will be appreciated that the histograms for FSK type modulation are characterized by "no activity" for the consecutive 0's and the consecutive 1's histograms. More importantly, the frequency histogram presents two positive spikes which delineate the two tone FSK type of modulation. Additionally, the amplitude histogram envelope of the FSK signal appears to be a bell-shaped curve which is characteristic of neither the two way voice communication nor the morse code transmission. Referring to FIG. 5, the four characteristic spikes characterize double FSK (e.g. 4 tones) or DFSK as it is sometimes referred to.

It will be seen that the histograms of the various types of modulation are, in fact, considerably different and are, in fact, time averaged so that they can be set to be characteristic of the type of signal.

Figure 6:
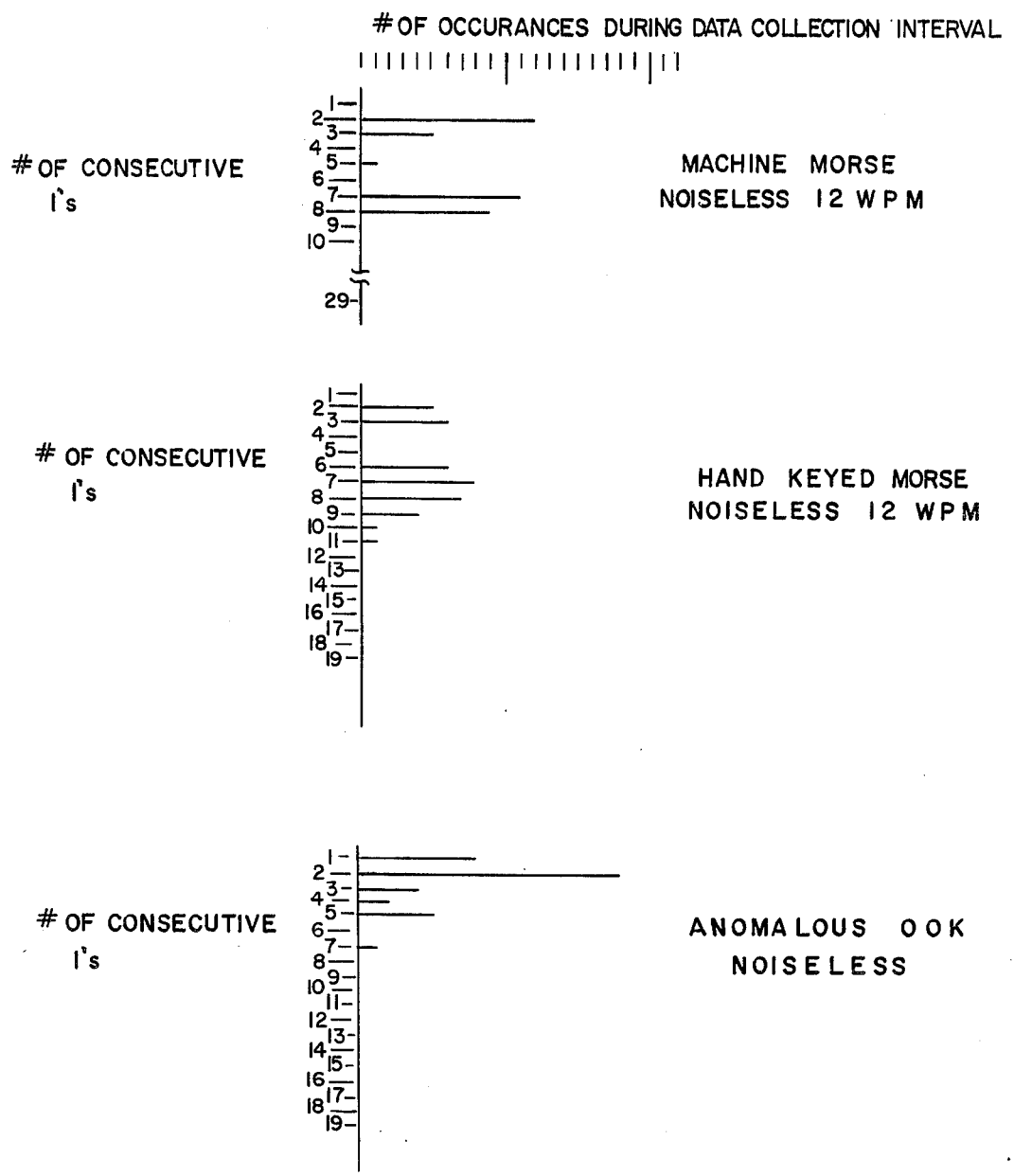
FIG. 6 is a series of diagrams of the consecutive 1's condition for machine morse, hand keyed morse and anomoulous morse.

It is even possible to differentiate between different types of on-off keying (OOK). As can be seen from FIG. 6 a machine noiseless morse at 12 words per minute has a characteristic two spike appearance whereas the hand keyed morse has a wider distribution over the same time. The anomalous OOK transmission also has a characteristic histogram in which a single peak or distribution occurs. In general, anomalous OOK transmissions are characterized by a comparatively large number of occurrences of the lower number of consecutive 1's and 0's and a comparatively large number of occurrences of higher numbers of consecutive 0's (not shown).

Depending on the modulation type sought, once a signal bearing a particular type of modulation is identified, this signal can be singled out and shunted to a conventional receiver for more complete demodulation. Often, however, it is not necessary to fully demodulate the incoming signal if the modulation type and its frequency yield sufficient information to identify the source of the signal.

Histogram Generation

In general, histogram generation involves first generating the requisite data and then applying this data to a so-called "histogram generator" which keeps track of the number of occurrences of a bin condition over the "data collection interval."

Figure 7:
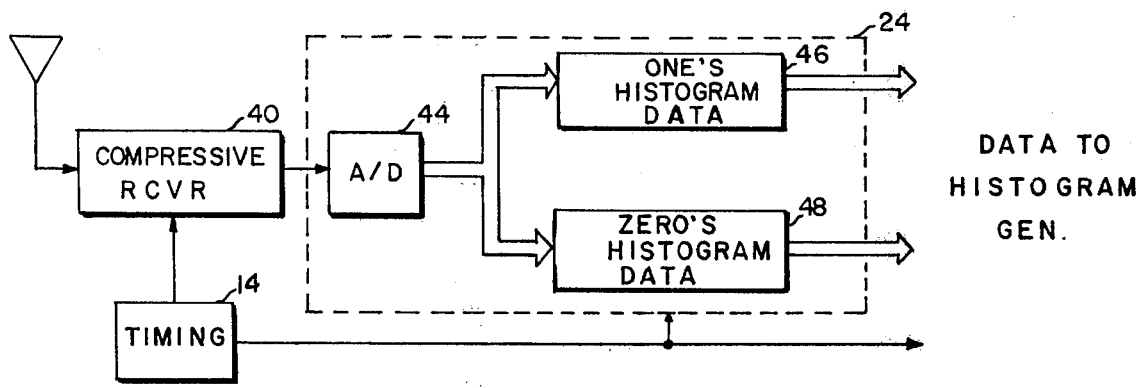
FIG. 7 is a block diagram illustrating the generation of the 1's histogram and the 0's histogram data.

Referring now to FIG. 7, the 1's and 0's histogram data generator is briefly described. Here, the compressive receiver log amp and filter are depicted together at 40 with the video output therefrom coupled to data generator 24 which includes a conventional high speed analog-to-digital (A/D) converter 44. The output from the analog-to-digital converter is coupled in one embodiment to a separate 1's data generator 46 and a separate 0's data generator 48. These generators will be described hereinafter in connection with FIG. 12.

The same type system is utilized with the frequency histogram data generator. In this case, the output of the center finder pulse generator 22 is applied to frequency histogram data generator 30 which, in general, comprises a ramp generator 50, the output of which is applied to a convention analog-to-digital converter 52. It will be appreciated that the ramp generator provides a signal of increasing voltage. The sweep is timed by timing circuit 14 such that the output of ramp generator 50 is correlatable in time with the output of the compressive receiver. This uniquely defines the frequency of the center finder pulse and the amplitude of the output of unit 50 is therefore one-to-one correlatable with frequency. In one embodiment the ramp is started at the edge of a frequency bin selection pulse from timing unit 14, e.g. the occurrence of $f_1$ in one example. Thereafter, the ramp is frozen upon the occurrence of an output signal from the CFP generator. The analog-to-digital conversion unit converts the output of the ramp generator to a digital equivalent and this is passed on to histogram generator 27 described hereinafter. Thus, for instance, if the output of the ramp generator is frozen at x volts, this may correspond to a frequency of 27,000. 250 KHz in the aforementioned example.

Figure 8:
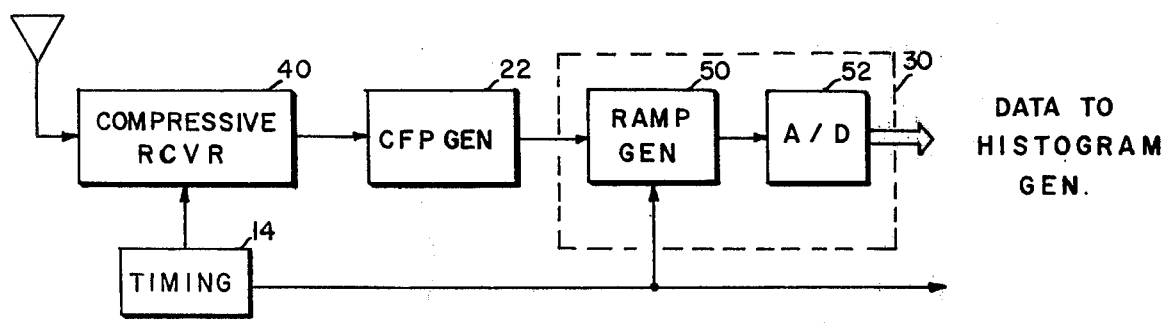
FIG. 8 is a block diagram illustrating the generation of the frequency histogram data.
Figure 9:
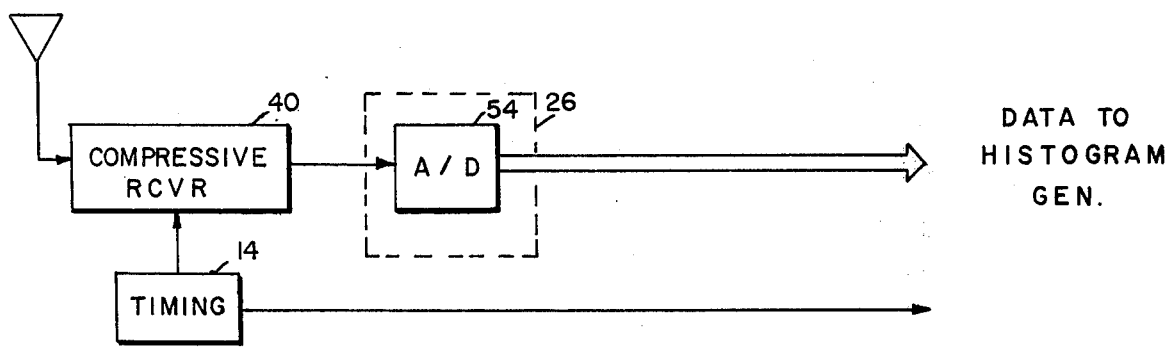
FIG. 9 is a block diagram illustrating the generation of the amplitude histogram data.

Referring to FIG. 8, the amplitude histogram data generator 26 is merely an conventional A/D converter 54.

Figure 10:
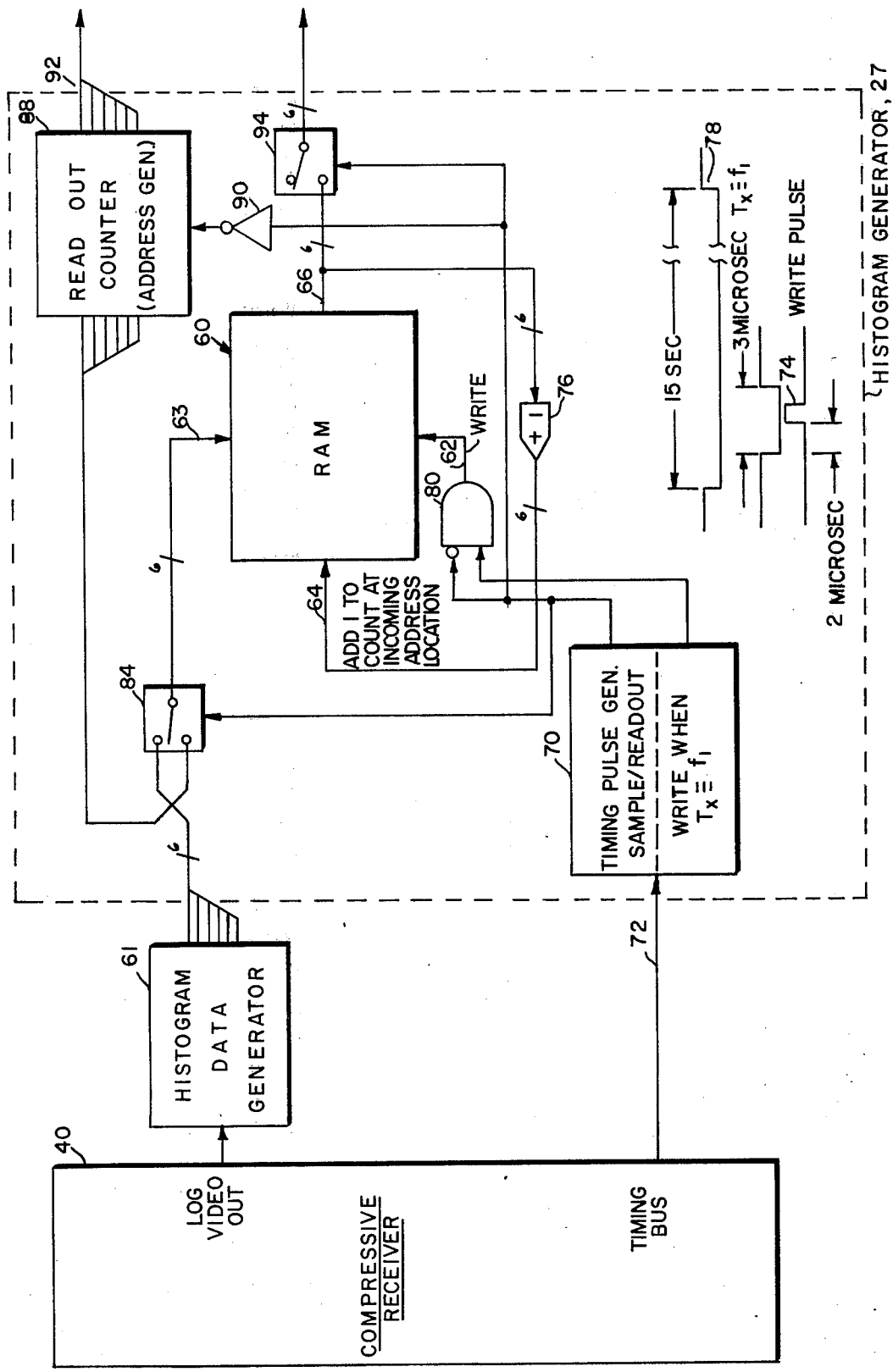
FIG. 10 is a block diagram illustrating one implementation of a histogram generator for all types of histogram data.

The outputs of all data generators are applied to histogram generator 27 which is illustrated in FIG. 10. This histogram generator processes the digital data to ascertain how many occurrences of the bin condition have occurred in a given time period for a given frequency input signal.

To do this a random access memory (RAM) 60 is used. In one embodiment this RAM is available from Signetics Corporation as Model No. 82SO9. The binary data from a data generator, here represented at 61, is applied to memory 60 and is used as an address to address a given memory location within memory 60. The address is therefore equivalent to the "designated condition" and thus the corresponding bin condition. Consequently, the address in the RAM corresponds to the "designated condition" and the number in the associated RAM register reflects the number of occurrences of the "designated condition" over the "data collection interval." How this is accomplished is now explained.

Memory 60 is normally in a READ mode, and is transferred to a WRITE mode by a positive going pulse on line 62. This RAM is so constructed that an address at its address input 63 enables the associated register in the memory either to receive input data on line 64 when the memory is in the WRITE mode, or to dump the contents of the register associated with this address in the normal READ mode over output line 66.

In order that the memory respond only to data relating to an incoming signal of a given frequency, the WRITE pulse for the memory is inhibited for any time $T_x \neq f_1$, where $T_x$ indicates a time x during the sweep of the compressive receiver. When during the cycling of receiver 40 $T_x = f_1$, memory 60 is shifted from READ to WRITE. This assures that only data relating to an input signal at $f_1$ is accumulated. The fact of $T_x = f_1$ is sensed by a timing pulse generator 70 coupled to receiver 40 via timing bus 72.

Generator 70 generates a pulse 74 two microseconds after $T_x = f_1$. This allows for the cycling of information from the RAM output to the RAM input through a conventional add "1" adder 76, to be described later. Note that in one embodiment the input signal from the compressive receiver is sampled for a period of three microseconds once every 40 milliseconds. Repetitive sampling occurs in one embodiment for a period of time on the order of 15 seconds. This latter time period is called the "data collection interval" to distinguish it from the "sample time," which is the time spent at $f_1$ during a frequency sweep.

Pulse generator 70 also generates an elongated pulse 78 during the time period (e.g. 15 seconds) over which data is accumulated, e.g. the "data collection interval." This pulse is applied to the inverting input terminal of an AND gate 80 which also has a non-inverting input terminal. Pulse 74 is applied to the non-inverting input terminal. AND gate 80 produces a pulse upon the simultaneous presence of pulses 74 and 78 such that the RAM is put in the WRITE mode two microseconds after $T_x = f_1$ during the "data collection interval."

Negative going pulse 78, in addition to placing the memory in the WRITE mode is also coupled to a gate 84 which selects address inputs either from histogram data generator 61 or from a readout counter 88, which when activated sequences through all the addresses of the RAM. Pulse 78 is inverted at 90 and is applied to the read out counter so that the readout counter cycles through its addresses immediately after the "data collection interval." The readout counter also supplies the sequentially read out addresses to the aforementioned display over lines 92.

On the positive going edge of pulse 78 a gate 94 couples output line 66 from the RAM to the display so that for every address there will be a corresponding number indicating the number of occurrences of the designated condition over the "data collection interval."

In order for the RAM to keep track of the number of occurrences of a bin condition, adder 76, which may be Fairchild Model 54LS283, is connected between RAM output 66 and RAM input 64. How the RAM counts bin condition occurrences is now described, for the amplitude histogram case.

Assuming an input signal at $f_1$, as the compressive receiver sweeps over its frequency range, data generator 61 generates an address corresponding to the input signal level. This is coupled to the address input terminals of the RAM. When $T_x \neq f_1$ the RAM is in its normal READ mode. Thus, the contents of the register associated with the incoming address is read out to adder 76 which adds 1 to the register contents. Two microseconds after $T_x f_1$ a WRITE pulse is generated. This causes the register contents "plus one" to be written back into the RAM at the incoming address.

What has happened is that the register corresponding to the incoming address has been incremented by 1, thereby indicating one occurrence of the bin condition indicated by the address.

Thereafter $T_x$ moves off $f_1$ and the WRITE pulse is inhibited. The RAM then goes back to its normal READ mode and is unaffected until the compressive receiver "revisits" $f_1$. At this time the incoming signal is again amplitude sampled, a corresponding address is generated, and a corresponding count is made.

The RAM/adder combination thus acts as an address counter, e.g. to count how many times an address appears, and this cycle persists for the 15 second "data collection interval."

To read out the RAM, all that is necessary is to cycle sequentially through all its addresses. Since the RAM is normally in the READ mode, the bin occurrence data will be read out on line 66 in synchronism with the address (bin condition) data. This is easily processed by conventional displays to give bin condition versus number of occurrences.

This simple histogram generator may be used with any type histogram data generator to yield histogram patterns which are peculiar to modulation type.

Figure 11:
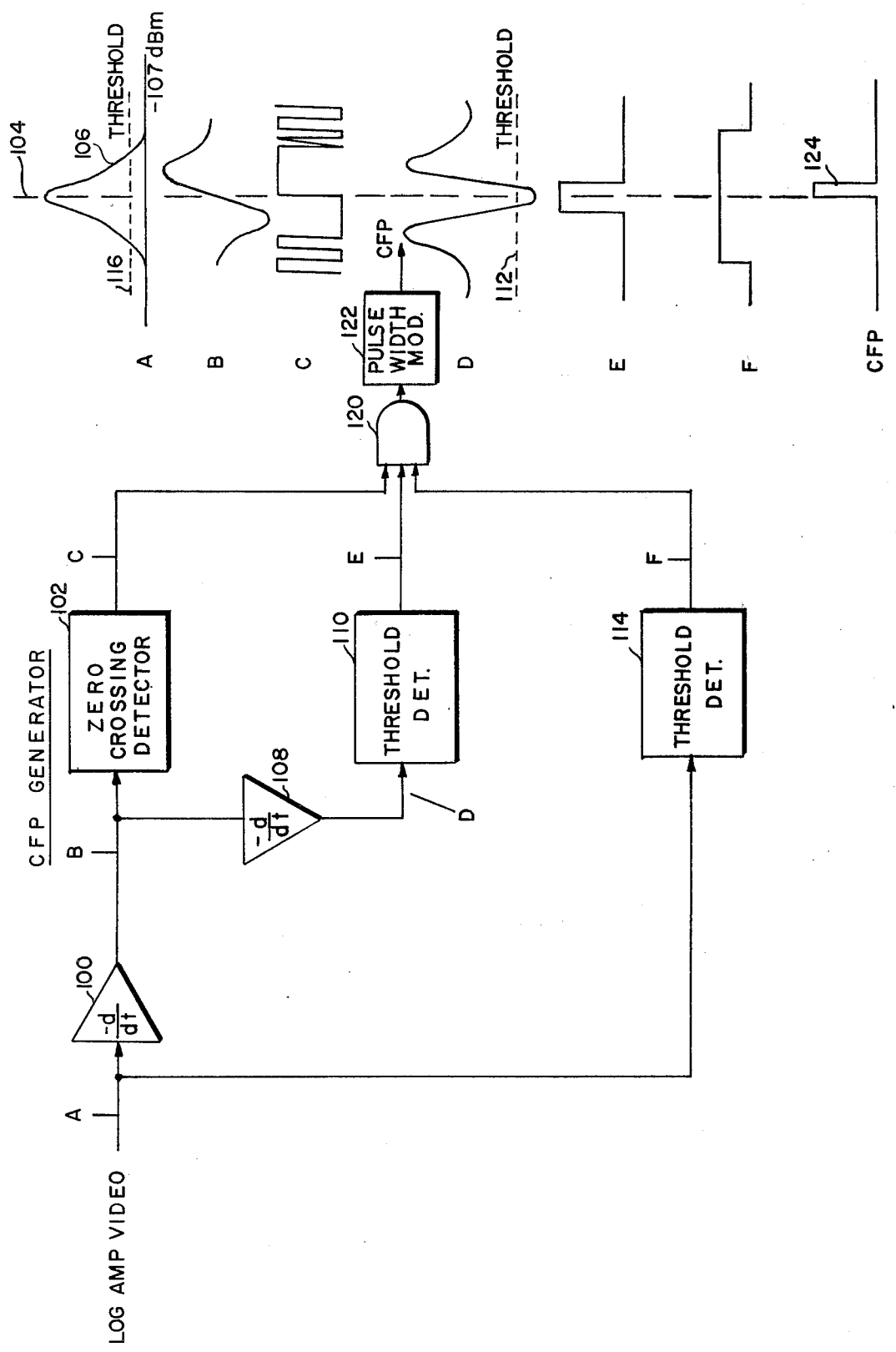
FIG. 11 is a block diagram illustrating one way of implementing the center finder pulse generator.

With reference to the CFP generator, and more particularly referring to the embodiment of this generator as illustrated in FIG. 11, it is a feature of this generator that the pulse produced by it be extremely carefully controlled such that its leading edge defines the exact center of the parabolically shaped log amplifier video signal such as that illustrated by waveform A in the upper right hand portion of FIG. 11. The log amplifier video signal is the filtered signal from the compressive receiver and is applied to a conventional differentiating unit 100, which provides at its output a waveform such as that described by waveform B of FIG. 11. The output of the differentiating unit is supplied to a zero crossing detector 102 of conventional design. The output of the zero crossing detector is the waveform illustrated at C, which in essence defines center line 104, which in turn, defines the exact center of the envelope 106 of waveform A.

The output from the first differentiating circuit is again differentiated by a similar conventional differentiating unit 108 and is applied to a conventional threshold detector 110. The output signal from the second differentiating unit is illustrated by waveform D and is basically the second derivative of the video signal illustrated at waveform A or the first derivative of the signal illustrated at waveform B.

Threshold detector 110 detects a threshold level such as that illustrated at 112 and produces a corresponding pulse such as that illustrated at waveform E.

The log amplifier video signal, in addition to being differentiated by unit 100, is applied to an additional conventional threshold detector 114 which is utilized to establish a threshold 116 illustrated at waveform A, such that the output of this threshold detector is a pulse illustrated by waveform F.

Waveforms C, E, and F are applied to an AND gate 120 such that with the simultaneous presence of the signals AND gate 120 produces a pulse which is applied to a conventional monostable multivibrator 122, such as Model 96SO2 from Fairchild Semiconductor Corporation, the function of which is to provide uniform width pulses such as illustrated by the pulse 124. This is the center finder pulse.

In operation the zero crossing detector defines the time that the peak of the log video envelope occurs and produces a positive going signal at this time. The doubly differentiated log amp/video signal is utilized in the production of a pulse which is centered around center line 104 and therefore is exactly centered around the time position of the center of envelope 106. Threshold detector 114 merely enables AND gate 120 when the log amplifier video signal is above a predetermined threshold, thereby to eliminate false outputs from AND gate 120. In essence, positive going waveforms E and F enable AND gate 120, whereas, the positive going portion of waveform C provides the final enabling signal for the AND gate, such that center finder pulse signal is produced with its positive going portion at the exact position of center line 104.

This accurate noise-free, error-free center finder pulse generator thus produces a uniform pulse whose rising or positive going portion is produced exactly at a position corresponding to the peak of the log amp video envelope. The time position of this leading edge therefore very accurately defines the frequency of the incoming signal, since it is the time position of the peak of the envelope from the compressive receiver which defines the frequency of the incoming signal. By utilization of this type of center finder pulse generator it is possible to obtain frequency bin widths on the order of 55 Hz. which is indeed narrow enough to be able to generate frequency histograms which can show frequency modulation of an incoming signal.

Figure 12:
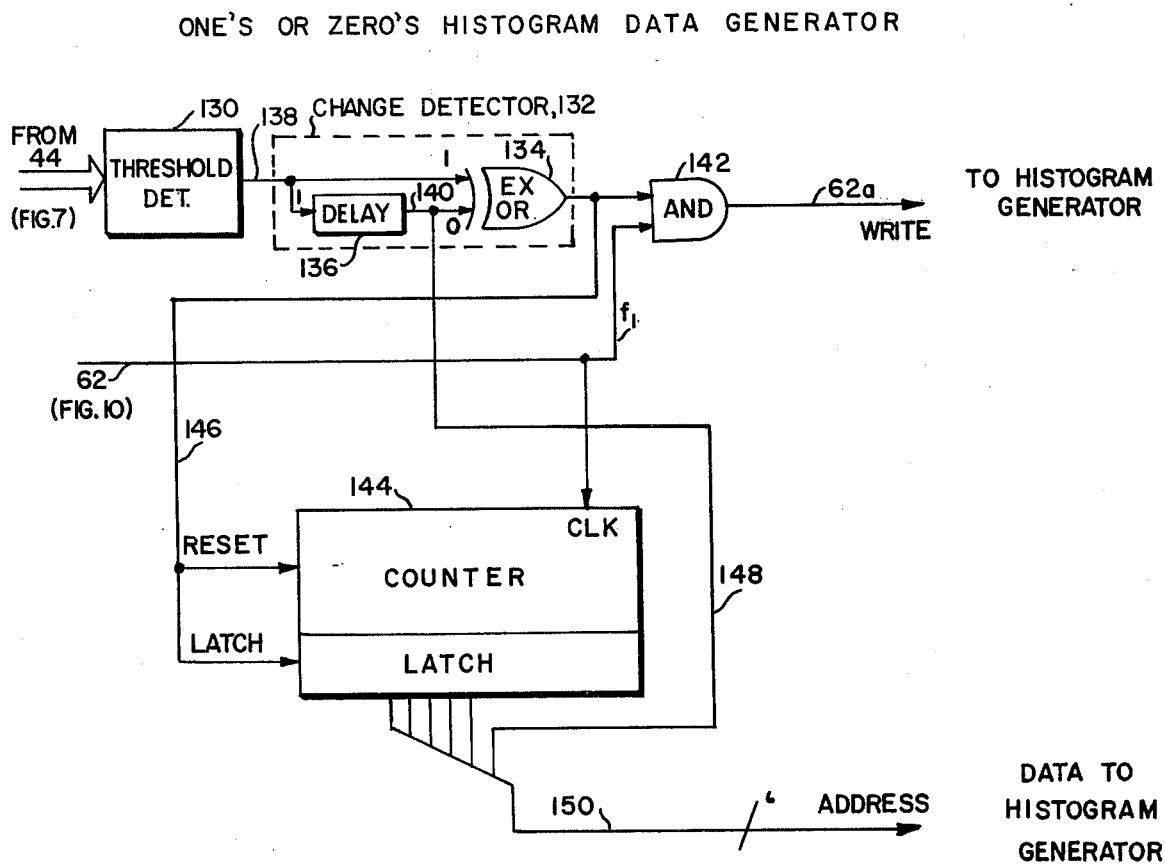
FIG. 12 is a block diagram illustrating one implementation of the 1's and 0's histogram data generator.

Referring now to FIG. 12, one embodiment of the 1's and 0's histogram data generator is illustrated in which data from analog-to-digital converter 44 of FIG. 7 is applied to a conventional digital threshold detector 130, available as Model No. 9324, from Fairchild Semiconductor Corporation, the output of which is applied to a change detector 132 which is comprised of a two input terminal exclusive OR gate 134 and a delay device 136. The delay stores the output of the threshold detector from the last sample or "visit" with a delay equal to the time between "revisits." As will be seen, this enables a sample from one "revisit" to be compared to the sample from the previous "revisit" so that a change in modulation state can be recognized.

The output from threshold detector 130 is delivered over a line 138 to one input terminal of the exclusive OR gate and also to the input terminal of delay 136. The output of delay 136 is applied over line 140 to the other input terminal of the exclusive OR gate. The output of the exclusive OR gate is coupled to one input terminal of a two input terminal AND gate 142 and also to a conventional counter and latch circuits 144. The counter portion of circuit 144 is available as Model 9LS161 from Fairchild Semiconductor Corporation, and the latch is available as Model 9LS174 from Fairchild Semiconductor Corporation.

The other input terminal of AND gate 142 is coupled to line 62 which is the line carrying the WRITE pulse in FIG. 10. A pulse on line 62 indicates that the compressive receiver is tuned to a frequency $f_1$. Rather than coupling line 62 to the histogram generator memory as illustrated in FIG. 10, in this embodiment the output of AND gate 142 is that which contains the WRITE pulse and it is this line which is coupled to the WRITE terminal of the histogram generator memory. This line is labeled as 62a in this diagram.

Line 62 is also coupled to the clock input of counter/latch circuit 144 as illustrated, to clock this circuit everytime the receiver revisits $f_1$.

As mentioned above, the output of the exclusive OR gate 134 is coupled to the counter/latch circuit 144 over line 146. A pulse on this line activates the latch portion of circuit 144 and thereafter resets the counter portion of this circuit.

The output of delay 136 in addition to being coupled to the exclusive OR gate is also coupled to the output of circuit 144 via line 148. Signals on this line form the most significant bit of the output 150 from the latch circuit to indicate whether the system is decoding 0's or 1's. Thus, the system described serves both as a 1's histogram data generator and a 0's histogram data generator. The output of the latch circuit is a binary signal which forms the address that is coupled to the histogram generator.

In operation, a digital signal representing the amplitude of the incoming signal is coupled to threshold detector 130. This threshold detector is set to a level which distinguishes 1's from 0's. In this case a change in amplitude indicates a change in modulation state, such as a change from a "signal" to "no signal" or a change from a "mark" to a "space." The following description discusses the "1's" histogram data generation in that threshold detector 130 produces a pulse whenever the input signal is above a given threshold, indicating a "mark." The pulse from the threshold detector is in the form of a logic level "1" signal which is applied to exclusive OR gate 134. At this time the output from delay 136 is zero there having been no previous output from the threshold detector.

The exclusive OR gate produces an output pulse when there is a logic level "1" signal at either of its two input terminals, but not when there is either no signal at its input terminals or when there are two signals at its input terminals. An output pulse from the exclusive OR gate indicates that there is a change in signal level, e.g. change in the modulation state of the incoming signal.

When the compressive receiver is tuned to $f_1$, AND gate 142 is enabled and produces a WRITE pulse on line 62a. This changes the random access memory in the histogram generator from a READ mode to a WRITE mode for approximately 1 microsecond, after which it returns to its normal READ mode.

Simultaneously the output from the exclusive OR gate enables the latch and then resets counter portions of circuit 144. In its initial state the counter has a count of zero and this is read out at 150 to the histogram generator.

Upon the next "revisit" of the compressive receiver to $f_1$, it will be appreciated that the first pulse delivered to delay line 136 is now at one of the input terminals to the exclusive OR gate 134. Upon this "revisit," should the modulation state continue to be in a "1" condition, then the threshold detector 130 produces another logic level "1" pulse. This pulse is delivered to the exclusive OR gate; but since there are two logic level "1" pulses at its input terminals there is no output pulse from the exclusive OR gate. This means that AND gate 142 is not enabled and the histogram generator memory stays in its normal READ mode. Further there is no latch or reset pulse to circuit 144. Rather, upon a clock pulse on line 62, the counter portion of circuit 144 advances one count and this is stored at the counter. Since there is no WRITE pulse on line 62a because AND gate 142 has been inhibited, nothing is written into the histogram generator memory at this time.

At the next "revisit" cycle, assuming that the modulation state of the incoming signals has changed, the output from the threshold detector will go to zero. However, from the previous "revisit" the output from delay line 136 is still at the logic level "1." Exclusive OR gate 134 will recognize the change and produce an output pulse which not only activates AND gate 142 to place the histogram generator memory in a WRITE mode, but also this pulse latches and then resets counter/latch circuit 144. Prior to being reset, the output of circuit 144 is read out and the number read out will be the number "1" since the counter was previously incremented by one. Note: when the number is read out its most significant bit supplied from the output of delay line 136 indicates consecutive 1's are being sensed. This is because at the time of modulation state change the output from the delay line is at a logic level "1".

What has transpired is that since there were two consecutive "1's", e.g. the first "1" and the second "1," this fact is noted by virtue of the counter carrying the number one and this number is read out at 150 to the histogram generator. The reading out of the number one corresponds to an address which indicates that there have been two consecutive 1's. This, in essence, is the bin condition and it is stored at the appropriate place in the histogram generator memory.

The following table sets out the previously described revisiting sequence for the two consecutive 1's case and also sets out the sequence for the three consecutive 1's case:

TABLE I

| Re-visit # | Modu-lation State | Output of Change DET | Counter | To Memory |
|---|---|---|---|---|
| Initial signal | "1" | Change indicated | Reset to "0" | "0" written in memory |
| #1 | "1" | No change | Counter +1 (due to clk) | Nothing written |
| #2 | "0" | Change indicated | Dump & reset | Write counter # prior to reset |
| Initial signal | "1" | Change indicated | Reset to "0" | "0" written in memory |
| #1 | "1" | No change | Counter +1 (due to clk) | Nothing written |
| #2 | "1" | No change | Counter +1 (due to clk) | Nothing written |
| #3 | "0" | Change indicated | Dump & reset | Write counter # prior to reset |

Dumped # = 00001 & indicates 2 consecutive "1's"
dumped # = 00010 & indicates 3 consecutive "1's".

It will be apparent from the operation of the circuit that the histogram generator memory is only placed in the WRITE mode when a consecutive string of "1's" ceases. Thus, the output of counter/latch circuit 144 is proportional to the number of consecutive 1's which have occurred. This number is the address and therefore the bin condition. The bin condition is noted by the histogram generator and the number of such occurrences over a 15 second data collection interval.

In summary, a counter is clocked in accordance with each "revisit" and the counter is allowed to accumulate until there is a change in the modulation state that is detected. When this change occurs, it is detected and the counter contents are dumped, with the counter contents reflecting the number of consecutive 1's that have occurred.

The operation for the "0's" histogram generator is identical with the exception of the most significant bit which addresses a different part of the histogram memory.

What has therefore been provided is a generalized system and method for determining the modulation type of an incoming signal, whether or not the incoming signal is insufficiently sampled, noting that this system is especially useful when the incoming signal is insufficiently sampled. This is done through the use of "histograms" which graph the bin condition against the number of occurrences of the bin condition over a data collection interval. The data collection interval is relatively long and, thus, provides a relatively accurate indication of the type of modulation, since different types of modulations have relatively stable types of amplitude, frequency and on-off keying histograms over this long a period. Moreover, in more general terms, the histogram measures not only the number of occurrences of the bin condition in the data collection interval but also the cumulative amount of time that the bin condition was present during the data collection interval. Thus, this system can be applied to modulation sorting systems which do not use repetitive sampling, as does the compressive receiver. All that is necessary is some means to measure the bin condition and the amount of time that the bin condition is present during the data collection interval.

Although a specific embodiment to the invention has been described in considerable detail for illustrative purposes many modifications will occur to those skilled in the art. It is therefore desired that the protection afforded by Letters Patent be limited only by the true scope of the appended claims.

What is claimed is:

1. A method of establishing the type of modulation impressed on a signal insufficiently sampled for complete demodulation comprising the steps of:
   detecting a designated modulation-related condition of said signal,
   correlating said designated condition with the amount of time said designated condition exists over a predetermined time period and,
   determining the modulation type based on the results of said correlation step.

2. The method of claim 1 wherein said modulation includes modulation state changes and wherein said predetermined time period is sufficiently long to allow a relatively large number of said modulation state changes to have occurred.

3. The method of claim 1 wherein said correlation step includes the step of visually portraying said designated condition on one axis and the amount of time said designated condition exists on a different axis.

4. The method of claim 1 wherein said steps include detecting more than one designated condition and correlating each of said designated conditions with the number of times the corresponding designated condition occurs over a predetermined time period, whereby the different correlations when taken together indicate modulation type.

5. The method of claim 4 wherein said designated conditions include consecutive 1's, consecutive 0's, frequency and amplitude singly or in combination.

6. A method of establishing the type of modulation impressed on a signal comprising the steps of:
   repetitively sampling said signal,
   detecting a designated modulation-related condition of each sample;
   correlating said designated condition against the number of times said designated condition occurs over a predetermined time period during the repetitive sampling process and
   determining the modulation type based on the results of said correlation step.

7. The method of claim 6 wherein said modulation includes modulation state changes and wherein said predetermined time period is sufficiently long to allow a relatively large number of said modulation state changes to have occurred.

8. The method of claim 6 wherein said correlation step includes the step of visually portraying said designated condition on one axis and said number of times said designated condition occurs on a different axis.

9. The method of claim 6 wherein said steps include simultaneously detecting more than one designated condition and simultaneously correlating each of said designated conditions with the number of times the corresponding designated condition occurs over a predetermined time period, whereby the different correlations when taken together indicate modulation type.

10. A method of establishing the type of modulation impressed on a signal which is insufficiently sampled for complete demodulation comprising:
   detecting a designated modulation-related condition of the samples taken of said signal, and,
   correlating said designated condition with the number of times said designated condition occurs within a predetermined time period determining the modulation type based on the results of said correlation step.

11. The method of claim 10 wherein said modulation includes modulation state changes and wherein said predetermined time period is sufficiently long to allow a relatively large number of said modulation state changes to have occurred.

12. The method of claim 10 wherein said correlation step includes the step of visually portraying said designated condition on one axis and said number of times said designated condition occurs on a different axis.

13. The method of claim 10 wherein said steps include simultaneously detecting more than one designated condition and simultaneously correlating each of said designated conditions with the number of times the corresponding designated condition occurs over a predetermined time period, whereby the different correlations when taken together indicate modulation type.

14. The method of claim 10 wherein said modulation includes modulation state changes and wherein said predetermined time period is long with respect to the time between changes of said modulation state.

15. A method of establishing the type of modulation impressed on a signal detected by a compressive receiver comprising the steps of:
   detecting a designated modulation-related condition of the output signal from said compressive receiver,
   correlating said designated condition with the number of times said designated condition occurs within a predetermined time period and,
   determining the modulation type based on the results of said correlation step.

16. The method of claim 15 wherein said modulation includes modulation state changes and wherein said predetermined time period is sufficiently long to allow a relatively large number of said modulation state changes to have occurred.

17. The method of claim 15 wherein said correlation step includes the step of visually portraying said designated condition on one axis and said number of times said designated condition occurs on a different axis.

18. The method of claim 15 wherein said step include simultaneously detecting more than one designated condition and simultaneously correlating each of said designated conditions with the number of times the corresponding designated condition occurs over a predetermined time period, whereby the different correlations when taken together indicate modulation type.

19. Apparatus for establishing the type of modulation impressed on a signal comprising:
   means for detecting a designated modulation-related condition of said signal,
   means for correlating said designated condition with the amount of time said designated condition exists over a predetermined time period and,
   means for determining the modulation type based on the correlation established by said correlating means.

20. The apparatus of claim 19 wherein said modulation includes modulation state changes and wherein said predetermined time period is sufficiently long to allow a relatively large number of said modulation state changes to have occurred.

21. The apparatus of claim 19 wherein said correlation means includes means for visually portraying said designated condition on one axis and the amount of time said designated condition exists on a different axis.

22. The apparatus of claim 19 and further including means for detecting more than one designated condition and for correlating each of said designated conditions with the number of times the corresponding designated condition occurs over a predetermined time period, whereby the different correlations when taken together indicate modulation type.

23. Apparatus for establishing the type of modulation impressed on a signal comprising:
  means for repetitively sampling said signal,
  means for detecting a designated modulation-related condition of each sample;
  means for correlating said designated condition against the number of times said designated condition occurs over a predetermined time period during the repetitive sampling process; and,
  means for determining the modulation type based on the correlation established by said correlating means.

24. The apparatus of claim 23 wherein said repetitive sampling means includes a compressive receiver.

25. In combination,
  a frequency swept compressive receiver;
  means for detecting a designated modulation-related condition of the signal from said compressive receiver;
  means for correlating said designated condition with the number of times said designated condition occurs over a predetermined data collection interval; and,
  means for determining modulation type based on the correlation established by said correlating means.

26. The combination of claim 25 wherein said detecting means includes means for transforming the occurrence of said designated condition into an address for a random access memory, and wherein said correlating means includes a random access memory normally operative in a READ mode, means for adding 1 to the contents of the register in said memory corresponding to the address of the incoming signal applied thereto whenever said incoming signal is present and said memory is in a WRITE mode, and means for placing said memory in a WRITE mode when, said receiver is tuned to a predetermined frequency, whereby after a number of sweeps of said receiver, the number in said register reflects the number of occurrences of said designated condition.

27. The combination of claim 25 wherein said detecting means includes means for detecting the frequency of the signal from said compressive receiver as said designated condition.

28. The combination of claim 27 wherein said frequency detecting means includes means for generating a signal envelope from the signals from said compressive receiver and means for generating a pulse having a time-position corresponding to the time-position of the peak of said envelope.

29. The combination of claim 25 wherein said detecting means includes means for detecting the amplitude of the signal from said compressive receiver as said designated condition.

30. The combination of claim 25 wherein said detecting means includes means for detecting the consecutive 1's or 0's condition of the signal from said compressive receiver as said designated condition.

31. The combination of claim 30 wherein said 1's or 0's detection means includes: a threshold detector for producing a logic level "1" signal when an input signal thereto is above a predetermined threshold and a logic level "0" signal when said input signal is below said predetermined threshold; means for detecting a change in the output of said threshold detector, thereby to detect a change in modulation state from a "1" to a "0" or visa versa; a counter/latch circuit having a clock input terminal, a reset input terminal, and a latch input terminal; a two input terminal AND gate; means for connecting the output of said change detecting means to said latch and reset input terminals and to one input terminal of said AND gate; means for generating a clock pulse when in the sweep of said compressive receiver, said receiver is tuned to a predetermined frequency; means for applying said clock pulse to the other input terminal of said AND gate and to said clock input terminal, whereby when no modulation state change occurs said counter circuit increases its count with each clock pulse, and whereby whenever a modulation state change occurs, upon the next clock pulse said AND gate produces a signal suitable to place a random access memory, which is normally in a READ mode, in a WRITE mode, said latch circuit is latched, the contents of said counter are dumped to indicate the number of consecutive 1's or 0's and said counter is reset, such that the counter contents may be written into said memory as an address therefor.

32. The combination of claim 31 wherein said change detection means includes a two input terminal exclusive OR gate, with one input terminal connected directly to the output of said threshold detector; means for delaying the signal from said threshold detector by the time it takes for said compressive receiver to revisit said predetermined frequency, and means for applying the output of said delay means to the other input terminal of said exclusive OR gate and to the output of said counter/latch circuit such that the output of said delay means forms the most significant bit of the output from said counter/latch circuit, whereby the output of said counter/latch circuit indicates whether the counter contents relates to consecutive 1's or consecutive 0's.

33. The combination of claim 31 wherein said correlating means includes a random access memory normally operative in a READ mode, means for connecting said memory to the output of said counter/latch circuit and to the output of said AND gate, and means for adding 1 to the contents of the register in said memory corresponding to the address of the incoming signal applied thereto whenever said incoming signal is present and said memory is in a WRITE mode, whereby after a number of sweeps of said receiver, the number in said register reflects the number of occurrences of said designated condition.

* * * * *